Dec. 10, 1929.  T. H. STRACHAN  1,738,933
MEAT CHOPPER
Filed Sept. 14, 1926
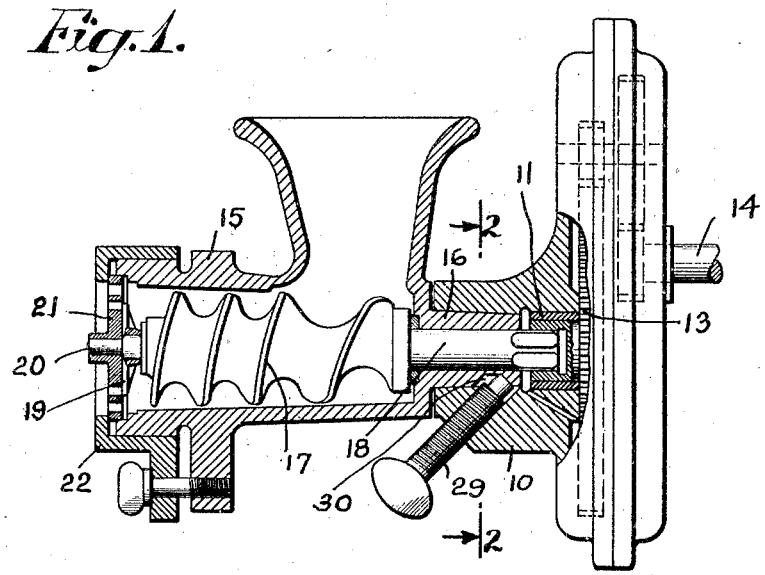
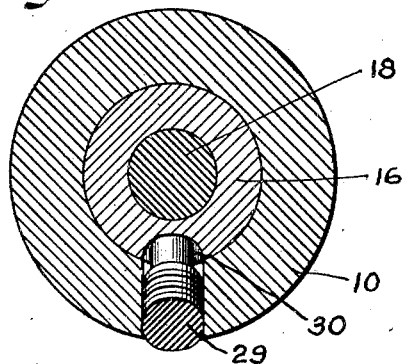
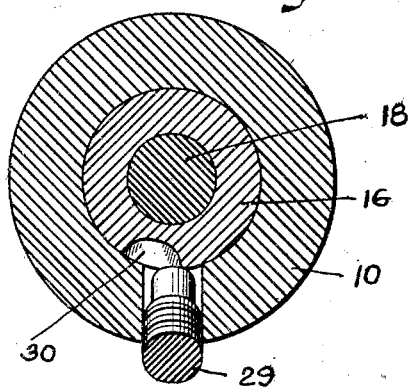
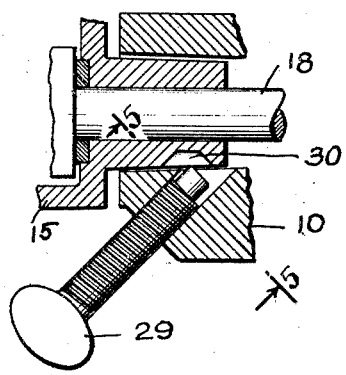
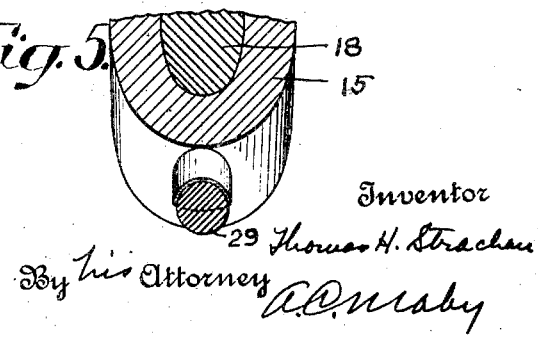
Inventor
Thomas H. Strachan
By his Attorney Patented Dec. 10, 1929

1,738,933

UNITED STATES PATENT OFFICE

THOMAS H. STRACHAN, OF DAYTON, OHIO, ASSIGNOR TO DAYTON SCALE COMPANY, OF DAYTON, OHIO, A CORPORATION OF NEW JERSEY

MEAT CHOPPER

Application filed September 14, 1926. Serial No. 135,441.

This invention relates to meat choppers, and more particularly to chopper bowls therefor.

In a common type of meat chopper it is the practice to utilize a tapered socket upon the housing cooperating with a tapered extension upon the chopper bowl assembly and to draw the parts together by a set screw having a conical end which takes into a conical socket upon the chopper parts. Relative rotation of bowl and frame is usually prevented by a supplemental lug which engages a socket on the housing.

The present invention is directed to a simplified construction in which the tapered conical end upon the set screw is obviated and the use of the supplementary lugs is dispensed with. A single set screw is utilized which is angularly disposed and which when advanced extends into a slot in the tapered extension of the chopper bowl and alternately abuts against an angular seat or shoulder. By this single set screw a simple means is provided for forming the bowl and housing together with a tight fit and thereafter preventing the relative rotational movement thereof. The set screw and slot construction also affords a simple means for piloting the bowl to proper position where it can be locked without the necessity of the operator relatively exactly rotatably aligning the bowl and housing before advancing the set screw.

Although the novel features which are believed to be characteristic of this invention will be pointed out with particularity in the claims appended hereto, the invention itself as to its objects and advantages, the mode of its operation and the manner of its organization may be better understood by referring to the following description taken in connection with the accompanying drawings forming a part thereof in which:

Fig. 1 is an elevation partly in section of a meat chopper having a bowl constructed in accordance with this invention.

Fig. 2 is a section on line 2—2 of Fig. 1.

Fig. 3 is a sectional view showing the chopper bowl slightly displaced from its normal position.

Fig. 4 is an enlarged deail view of the attaching means, and

Fig. 5 is a section taken on line 5—5 of Fig. 4.

Referring to the figures more in detail, a portion of a casing 10 of a standard type of meat chopper is shown having a rotating socketed shaft 11 for driving the movable parts of the chopper. Rotational movement is imparted to socket shaft 11 by means of gear train 13 and cooperating shaft 14 which may be actuated by manual means or by an electric motor. Inasmuch as the above features form no part of the present invention they have been shown in conventional manner only.

Chopper bowl 15 is provided with a tapered extension 16 which cooperates with a tapered socket in housing 10 of the meat chopper. Meat advancing screw 17 is provided with shank 18 having an end adapted to fit into and be driven by socket shaft 11. Screw 17 is provided with the usual cutting blades 19 and is supported in bearing 20 carried by perforated disc 21. Disc 21 is attached to bowl 15 by means of a supporting ring 22 which is held in position by screw 23.

The means for attaching bowl 15 to casing 10, which is shown more in detail in Fig. 4, comprises an angularly disposed thumb screw carried by casing 10 cooperating with longitudinal slot 30 in extension 16. Slot 30 is of elliptical cross-section, the inner ends of the slot being disposed perpendicular to the axis of screw 29.

Should extension 16 not be inserted its full extent in casing 10, screw 29 in advancing will contact with the end of slot 30, and by imparting longitudinal movement thereto will draw extension 16 its full extent into casing 10 and firmly fasten it therein. In case bowl 15 has been inserted in casing 10 in a position slightly displaced from normal, slot 30 will be in the relation to screw 29 shown in Fig. 3. In this position, if screw 29 is advanced, it will cause rotation of extension 16 until it has assumed the position shown in Fig. 2, after which it will be advanced as above described until firmly seated in casing 10.

By the construction above set forth a single manually operated means is provided for preventing both rotational and longitudinal movement of the chopper bowl with respect to its supporting casing, and furthermore the means is adapted to automatically seat the bowl provided the latter is inserted in the casing in approximately the required position. The angularly disposed screw cooperating with slot 30 will impart a slight rotational movement to extension 16 and bowl 15 carried thereby if necessary to properly seat the bowl in casing 10, and also impart the required longitudinal movement to cause extension 16 to be inserted its full extent in its cooperating socket in the casing.

Slot 30 may be readily formed by inserting a drill at an angle to the axis of extension 16 corresponding to that formed by the axis of screw 29. After the drill has penetrated the required distance it may be longitudinally advanced to form the elongated slot, the end of the drill forming one end of the slot and the side of the drill forming the other end.

Although this invention has been shown and described as applied to a particular form of meat chopper, it is not to be limited thereto but may be applied to other forms of meat choppers or other household devices, such as coffee mills. It is therefore to be limited only in accordance with the scope of the following claim.

What is claimed is:

A meat chopper comprising a casing, a worm rotatably mounted therein, a fixed frame, a round socket formed in said frame, a round stub shaft provided on said casing and seated in said socket, a depression formed in the periphery of said shaft, said depression being of varying elliptical cross-section with the major axes disposed longitudinally of said shaft, a threaded bore formed in said frame at an incline to said depression, and a screw with a flat end threaded into said bore for cooperating with the curved walls of said depression, the end of the screw and the elliptical depression being wedged into each other in a direction longitudinal of the screw and also in a direction laterally of the screw to resist forward and rotary thrust of said shaft with a wedging action, and the screw and depression cooperating upon movement of the screw into the depression to bring the shaft from a position out of alinement into one of alinement.

In testimony whereof I hereto affix my signature.

THOMAS H. STRACHAN.